United States Patent
Lange et al.

(10) Patent No.: US 10,407,593 B2
(45) Date of Patent: *Sep. 10, 2019

(54) OLIGOESTERS COMPOSITIONS AND METHODS OF MAKING AND USING SAME

(71) Applicant: Kraton Chemical, LLC, Jacksonville, FL (US)

(72) Inventors: Jos H. M. Lange, Almere (NL); Mark C Schaapman, Almere (NL)

(73) Assignee: Kraton Chemical, LLC, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/713,644

(22) Filed: Sep. 23, 2017

(65) Prior Publication Data

US 2018/0086942 A1 Mar. 29, 2018

Related U.S. Application Data

(60) Provisional application No. 62/398,723, filed on Sep. 23, 2016.

(51) Int. Cl.
| | |
|---|---|
| *C09F 1/04* | (2006.01) |
| *C09D 5/33* | (2006.01) |
| *C09D 193/04* | (2006.01) |
| *C09D 201/00* | (2006.01) |
| *C09J 193/04* | (2006.01) |
| *C09J 201/00* | (2006.01) |
| *C08L 93/04* | (2006.01) |

(52) U.S. Cl.
CPC ............ *C09F 1/04* (2013.01); *C08L 93/04* (2013.01); *C09D 5/004* (2013.01); *C09D 193/04* (2013.01); *C09D 201/00* (2013.01); *C09J 193/04* (2013.01); *C09J 201/00* (2013.01)

(58) Field of Classification Search
CPC .. B60R 2021/0041; B60R 2021/23316; B60R 21/23138; B60R 21/233; C09D 193/04; C09D 201/00; C09D 5/004; C09F 1/04; C09J 193/04; C09J 201/00
See application file for complete search history.

(56) References Cited

U.S. PATENT DOCUMENTS

| | | |
|---|---|---|
| 1,820,265 A | 8/1931 | Bent et al. |
| 2,017,866 A | 10/1935 | Morton et al. |
| 2,108,928 A | 2/1938 | Rummelsburg et al. |
| 2,369,125 A | 2/1945 | Anderson |
| 2,518,497 A | 8/1950 | Rust |
| 2,729,660 A | 1/1956 | Harrison |
| 2,791,568 A | 5/1957 | Shapiro et al. |
| 2,889,293 A | 6/1959 | Hensley et al. |
| 2,965,588 A | 12/1960 | Spencer |
| 3,310,575 A | 3/1967 | Spivack |
| 3,423,389 A | 1/1969 | Wheelus |
| 3,780,013 A | 12/1973 | Smith |
| 3,959,410 A | 5/1976 | DiRossi |
| 4,100,119 A | 7/1978 | Lerman |
| 4,172,070 A | 10/1979 | Scharrer et al. |
| 4,302,371 A | 11/1981 | Matsuo et al. |
| 4,368,316 A | 1/1983 | Laddha et al. |
| 4,377,510 A | 3/1983 | Ruckel et al. |
| 4,380,513 A | 4/1983 | Ruckel et al. |
| 4,548,746 A | 10/1985 | Duncan et al. |
| 4,657,703 A | 4/1987 | Durkee |
| 4,690,783 A | 9/1987 | Johnson, Jr. |
| 4,693,847 A | 9/1987 | Johnson, Jr. |
| 4,725,384 A | 2/1988 | Du Vernet |
| 4,744,925 A | 5/1988 | Lampo et al. |
| 4,788,009 A | 11/1988 | Johnson, Jr. |
| 5,021,548 A | 6/1991 | Minn |
| 5,036,129 A | 7/1991 | Atwell et al. |
| 5,049,652 A | 9/1991 | Minn |
| 5,120,781 A | 6/1992 | Johnson, Jr. |
| 5,504,152 A | 4/1996 | Schluenz et al. |
| 2011/0034669 A1 | 2/2011 | Dallavia |
| 2013/0197152 A1 | 8/2013 | Herve et al. |
| 2016/0222259 A1* | 8/2016 | Lange ............... C09J 193/04 |

FOREIGN PATENT DOCUMENTS

| | | |
|---|---|---|
| EP | 0112446 B1 | 5/1986 |
| EP | 2835390 B1 | 3/2016 |
| GB | 480336 | 2/1938 |
| GB | 563554 | 8/1944 |
| GB | 599546 | 3/1948 |
| GB | 680996 | 10/1952 |
| GB | 729424 | 5/1955 |
| GB | 1100392 | 1/1968 |
| WO | 2013/167662 A1 | 11/2013 |
| WO | 2015/048402 | 4/2015 |

OTHER PUBLICATIONS

Technical Data Sheet Eastman™ 1,4-CHDA-H Oct. 2008.*

* cited by examiner

*Primary Examiner* — Ling Siu Choi
*Assistant Examiner* — Gennadiy Mesh
(74) *Attorney, Agent, or Firm* — Ramesh Krishnamurti

(57) ABSTRACT

An Oligoester composition obtained from a reactant mixture comprising one or more rosin; one or more polyhydric alcohol selected from the group of polyhydric alcohols having from 2 to 30 carbon atoms, and from 0.5 wt. % to 15 wt. %, based on the weight of all reactants, of one or more polyfunctional carboxylic acids selected from cycloaliphatic dicarboxylic polyfunctional carboxylic acids, and wherein the one or more polyhydric alcohol is present in the mixture for preparation of the Oligoester an amount of from 5 wt. % to 35 wt. %, based on the weight of all reactants. Oligoester composition has a hydroxyl value of from 7 mg KOH/g to 40 mg KOH/g and suitable for use in road marking, adhesives or tire tread.

15 Claims, No Drawings

OLIGOESTERS COMPOSITIONS AND METHODS OF MAKING AND USING SAME

CROSS REFERENCE TO RELATED APPLICATIONS

This application claims the benefit of priority to the U.S. Provisional Application No. 62/398,723 filed Sep. 23, 2016, incorporated herein in its entirety.

TECHNICAL FIELD

The present disclosure generally relates to chemistry and more particularly to oligoesters.

BACKGROUND

U.S. Patent Publication No. 2011/0034669 discloses a process for producing light color rosins ester resin, preferably based on tall rosin. The process allows for the use of lower colored or darker tall oil rosin in the production of low color rosin esters.

WO 2015/048402 discloses compositions which include an ethylene polymer derived from at least one polar monomer with one or more ester groups, which polymerize with ethylene, (e.g., a copolymer derived from ethylene and vinyl acetate or a copolymer derived from ethylene and n-butyl acrylate) and a rosin ester. The rosin ester can have a low hydroxyl number (e.g., a hydroxyl number six or five or less), a low acid number (e.g., an acid number often or less), a low PAN number (e.g., a PAN number of eight or less), or combinations thereof.

U.S. Pat. No. 5,120,781 discloses polyhydric alcohol rosin esters which had been modified with an aromatic dibasic acid such that the softening point of the acid-modified polyhydric alcohol rosin ester is higher than that of a comparable unmodified polyhydric alcohol rosin ester.

U.S. Pat. No. 1,820,265 discloses formations of rosin esters which are typically made by the reaction of a mixture of isomeric $C_{20}$ tricyclic mono-carboxylic acids.

U.S. Pat. No. 5,504,152 discloses a method for esterifying rosins with a polyol under esterification conditions to produce a rosin ester. The specification also describes a method for preparing an adhesive from the rosin ester.

There exists an ongoing need in the art for novel rosin esters having some user and/or process-desired combination of properties.

SUMMARY

Disclosed herein is an oligoester composition derived from one or more rosins; one or more polyhydric alcohols; and one or more polyfunctional carboxylic acids; wherein at least one of the polyfunctional carboxylic acids comprises a cycloaliphatic polyfunctional carboxylic acid having 5 to 19 carbon atoms.

Further disclosed herein is an oligoester composition derived from one or more rosins; one or more polyhydric alcohols; and one or more polyfunctional carboxylic acids comprising aliphatic dicarboxylic acids; wherein at least one of the aliphatic dicarboxylic acids comprises a cycloaliphatic dicarboxylic acid having 5 to 19 carbon atoms.

Also disclosed herein is an oligoester composition derived from one or more rosins; one or more polyhydric alcohols; and one or more polyfunctional carboxylic acids comprising saturated dicarboxylic acids; wherein at least one of the dicarboxylic acids comprises a cycloaliphatic dicarboxylic acid having 5 to 19 carbon atoms, and wherein the total of dicarboxylic acids amounts from more than zero up to 15 wt. %, by weight of all reactants.

DETAILED DESCRIPTION

The following discloses methods that may be employed in the present disclosure.

ASTM D5974-00 (published in 2010) is entitled "Standard Test Methods for Fatty and Rosin Acids in Tall Oil Fractionation Products by Capillary Gas Chromatography."

Disclosed herein are oligoester compositions comprising a novel modified rosin ester. In an aspect, the rosin ester is prepared by contacting (i) at least one rosin, (ii) at least one polyhydric alcohol, and (iii) at least one polyfunctional cycloaliphatic carboxylic acid or anhydride under suitable conditions. In an aspect, a method of preparing a rosin ester of the type disclosed herein excludes a Diels-Alder reaction step and/or the inclusion of dienophile during preparation of the rosin ester. The resulting material is termed herein a rosin ester composition; designated REC. Compositions prepared from a REC may be utilized in a variety of applications.

In an aspect a reaction mixture for preparation of a REC of the type disclosed herein may include at least one rosin. Rosin, also called colophony or Greek pitch (Pix græca), is a solid hydrocarbon secretion of plants, typically of conifers such as pines (e.g., *Pinus palustris* and *Pinus caribaea*). Rosin consists of a complex mixture of mutually soluble organic compounds such as free organic acids, called rosin acids, as well as non-acidic saponifiable and unsaponifiable substances (neutrals).

Rosin acids are $C_{20}$ fused-ring monocarboxylic acids with a nucleus of three fused six-carbon rings containing double bonds that vary in number and location. Nonlimiting examples of rosin acids may include but not limited to abietic acid, neoabietic acid, dehydroabietic acid, dihydroabietic acid, pimaric acid, levopimaric acid, sandaracopimaric acid, isopimaric acid, and palustric acid. More comprehensive information on the chemical composition, including major and minor chemical components, of different rosin types and sources can be found in *Naval Stores*, (Eds.: D. F. Zinkel, J. R. Russell), Production, Chemistry, Utilization, Pulp Chemicals Association, New York, 1989, Chapter 9, Chemistry of Rosin, pp. 261-345, which is incorporated herein by reference in its entirety.

In an aspect, the rosin is a tall oil-based rosin (tall oil rosin or TOR). TOR can typically be obtained by distilling crude tall oil which is a by-product of the pulping process of kraft sulphate. TOR has the ability to crystallize and is generally composed of 200 parts per million (ppm)-1000 ppm of sulfur.

In an aspect, the rosin is a wood rosin. Wood rosin refers to material obtained by solvent extraction of aged and ground pine stumps. For example, wood rosin may be obtained from pine trees after the stump is allowed to remain in the ground for about ten years. After this time period the tree's bark and sapwood may decay and slough off to leave the heartwood rich in rosin.

In an aspect, the rosin is a gum rosin. Gum rosin is typically obtained by tapping the living tree to collect oleoresin followed by distillation to yield turpentine and a resinous substance. Gum rosin is characteristically a translucent yellowish to dark brown material that is composed chiefly of abietic acid and related compounds.

In an aspect, a rosin may be a hydrogenated gum rosin. Hydrogenation is a reduction reaction, which can result in addition of hydrogen to a reactant. Hydrogenation of an alkene moiety, such as an alkene present in the ring structure of a rosin acid moiety, can reduce the olefinic bond to produce the corresponding saturated moiety. Hydrogenation reactions can be carried out using a catalyst, such as a heterogeneous hydrogenation catalyst (e.g., a palladium catalyst, such as Pd supported on carbon (Pd/C), a platinum catalyst, such as $PtO_2$, a nickel catalyst, such as Raney Nickel (Ra—Ni), a rhodium catalyst, or a ruthenium catalyst). The hydrogen source for the hydrogenation can by hydrogen ($H_2$) or a compound which can generate hydrogen under reaction conditions, such as formic acid, isopropanol or hydrazine.

Accordingly, hydrogenation may be performed, for example, to reduce the PAN number of a rosin. The PAN number refers to the weight percentage of abietadienoic acids present in the rosin, based on the total weight of the rosin or rosin ester. The term "PAN number", as used herein, refers to the sum of the weight percentages of palustric, abietic and neoabietic acid moieties in the rosin as determined according to method described in ASTM D5974-00 (2010).

An example of a commercially available hydrogenated rosin is Foral™ AX-E, which is marketed by Eastman Chemical Company. Staybelite™ Resin-E is an example of a commercially available partially hydrogenated rosin which is also marketed by Eastman Chemical Company. HYDROGAL is an example of a commercially available hydrogenated rosin which is marketed by DRT (Dérivés Résiniques et Terpéniques).

Any type of rosin may be used to prepare the RECs described herein, including tall oil rosin, gum rosin, wood rosin and combinations thereof. Examples of commercially available rosins suitable for use in the present disclosure include, without limitation, tall oil rosins such as SYLVAROS™ 85, SYLVAROS™ 90, SYLVAROS™ R type S, and SYLVAROS™ NCY, commercially available from Arizona Chemical Company, LLC.

Rosins may be obtained from a commercial source, a natural source, or combinations thereof. In the alternative, the rosin may be subjected to one or more purification steps (e.g., distillation under reduced pressure, extraction, and/or crystallization) prior its use in the preparation of the REC. In some aspects, the REC is prepared utilizing one or more purified rosin acids (e.g., abietic acid, neoabietic acid, pimaric acid, levopimaric acid, sandaracopimaric acid, isopimaric acid, palustric acid, dehydroabietic acid, dihydroabietic acid, or combinations thereof) in lieu of or in addition to a rosin of the type disclosed herein.

In an aspect, the rosin may be present in a mixture for preparation of the REC in an amount of from about 55 wt. % to about 95 wt. %, alternatively from about 60 wt. % to about 93 wt. %, or alternatively from about 80 wt. % to about 91 wt. %.

In some aspects, a rosin may be subjected to one or more processing steps in order to improve the chemical and physical properties of the resultant REC. Where chemically permissible, such methods may also be performed prior to, concomitant with, or subsequent to preparation of an REC of the type disclosed herein.

In some aspects, the rosin is partly dimerized or polymerized to obtain after esterification rosin esters having the desired chemical and physical properties for a particular application. Rosin polymerization and dimerization reactions are described in patent applications such as for example U.S. Pat. Nos. 2,369,125, 2,017,866, and 2,108,928 which are incorporated herein by reference in their entirety. Such rosin polymerization and dimerization reactions may be catalyzed by BrØnsted acids such as sulfuric acid or by Lewis acids such as $AlCl_3$. An example of a commercially available polymerized rosin is Dymerex™ which is marketed by Eastman Chemical Company. POLYGRAL and DERTOPOL are examples of commercially available polymerized rosins which are marketed by DRT (Dérivés Résiniques et Terpéniques).

In some aspects, the rosin is disproportionated prior to utilization as a reactant in the preparation of a REC. Rosin disproportionation converts abietadienoic acid moieties into dehydroabietic acid and dihydroabietic acid moieties. Methods of disproportionation may involve heating rosin, often in the presence of one or more disproportionation agents. Suitable methods for disproportionating rosin are described in, for example, U.S. Pat. Nos. 3,423,389, 4,302,371, and 4,657,703, all of which are incorporated herein by reference in their entirety.

In certain aspects, a disproportionated rosin or partly disproportionated rosin may be used as a reactant in the preparation of an REC of the type disclosed herein. In some cases, disproportionation or further disproportionation can be conducted during the preparation of a REC (e.g., during the esterification reaction). For example, disproportionated or partly disproportionated rosin may be generated in situ and reacted thereafter in a one-pot synthesis procedure to a obtain an REC of the type disclosed herein. GRESINOX 578 M and GRESINOX 511 are examples of commercially available disproportionated rosins which are marketed by DRT (Dérivés Résiniques et Terpéniques).

In an aspect, a reaction mixture for preparation of a REC may include at least one polyhydric alcohol (e.g., a polyalcohol or polyol). In some aspects, the polyhydric alcohol may comprise any hydrocarbon having at least 2 alcohol groups (also termed hydroxy groups); alternatively, at least 3 alcohol groups; or alternatively, at least 4 alcohol groups. The polyhydric alcohol may have an average number of hydroxyl functionalities of from 2 to 10, alternatively from 2 to 6, or alternatively from 2 to 5. In some aspects, the polyhydric alcohol comprises from 2 to 30 carbon atoms, alternatively from 2 to 16 carbon atoms, or alternatively from 2 to 10 carbon atoms. In an aspect, the polyhydric alcohol is characterized by a boiling point of greater than about 240° C. In an aspect, the polyhydric alcohol may contain up to a total of 20 wt. % of one or more monoalcohols, based on the total weight of polyhydric alcohol, provided that the monoalcohols are characterized by a boiling point of greater than about 230° C. An example of such a monoalcohol is diethylene glycol monohexyl ether.

In some aspects, the polyhydric alcohol comprises a glycol, a sugar, a reduced sugar, an oligomer of a glycol, or combinations thereof. In some other aspects, the polyhydric alcohol comprises an aliphatic alcohol, or alternatively a cycloaliphatic alcohol.

In an aspect, the polyhydric alcohol comprises ethylene glycol, propylene glycol, diethylene glycol, triethylene glycol, tetraethylene glycol, neopentylglycol, trimethylene glycol, glycerol, trimethylolpropane, trimethylolethane, pentaerythritol, pentaerythritol technical grade, dipentaerythritol, tripentaerythritol, 1,4-cyclohexanediol, polyglycerol, polyglycerol technical grade, polyglycerol-3, polyglycerol-4, cyclohexane-1,4-dimethanol, tricyclo[5.2.1.0(2.6)]decane-4,8-dimethanol, hydrogenated bisphenol A (4,4'-Isopropylidenedicyclohexanol), mannitol, sorbitol, xylitol, maltitol, lactitol, or combinations thereof. Alternatively, the polyhydric alcohol comprise diethylene glycol, triethylene glycol, glycerol, trimethylolpropane, pentaerythritol, pentaerythritol technical grade, dipentaerythritol, polyglycerol, polyglycerol-4, tricyclo[5.2.1.0(2.6)]decane-4,8-dimethanol, cyclohexane-1,4-dimethanol, hydrogenated bisphenol A (4,4'-isopropylidenedicyclohexanol), or combinations thereof.

In an aspect, the polyhydric alcohol may be present in a mixture for preparation of the REC in an amount of from about 5 wt. % to about 35 wt. %, alternatively from about 6 wt. % to about 25 wt. %, or alternatively from about 8 wt. % to about 20 wt. %.

In an aspect, a reaction mixture for preparation of a REC of the type disclosed herein comprises at least one polyfunctional carboxylic acid. In some aspects, the polyfunctional carboxylic acid is aliphatic (e.g., cycloaliphatic). In some aspects, the polyfunctional carboxylic acid is a dicarboxylic acid, a tricarboxylic acid, a tetracarboxylic acid, or combinations thereof. An example of a tetracarboxylic acid is cis,cis,cis,cis-1,2,3,4-cyclopentanetetracarboxylic acid.

Aliphatic polyfunctional carboxylic acids suitable for use in the present disclosure include without limitation saturated, partly unsaturated, linear and branched polyfunctional carboxylic acids. Cycloaliphatic polyfunctional carboxylic acids suitable for use in the present disclosure include without limitation one to four rings in their molecular structure, and are referred to as monocyclic (one ring), bicyclic (two rings), tricyclic (three rings), or tetracyclic (three rings). In the case of more than one ring present, rings may be present as fused ring systems, bridged fused ring systems, spiro rings, isolated rings, or combinations thereof.

In an aspect, the polyfunctional carboxylic acid is a dicarboxylic acid such as camphoric acid, cis-norbornene-endo-2,3-carboxylic acid, 1,2-cyclohexanedicarboxylic acid, 1,3-cyclohexanedicarboxylic acid and 1,4-cyclohexanedicarboxylic acid, which may occur in the form of different stereoisomers. The present disclosure includes all these stereoisomers and mixtures thereof, including optically active stereoisomers such as enantiomers and diastereomers as polyfunctional carboxylic acids suitable for use in the preparation of a REC. Examples of such stereoisomers are cis isomers and trans isomers. For example, 1,4-cyclohexanedicarboxylic acid high purity grade (CAS No. 1076-97-7) as marketed by Eastman is a mixture of cis and trans isomers.

In some aspects, the polyfunctional carboxylic acids comprise dicarboxylic acids, saturated dicarboxylic acids, partially saturated dicarboxylic acids, or combinations thereof. In some aspects, the polyfunctional carboxylic acids comprise tricarboxylic acids, saturated tricarboxylic acids, partially saturated tricarboxylic acids, or combinations thereof. In some aspects, the polyfunctional carboxylic acids comprise tetracarboxylic acids, saturated tetracarboxylic acids, partially saturated tetracarboxylic acids, or combinations thereof.

In some aspects, the polyfunctional carboxylic acid comprises an aliphatic linear difunctional carboxylic acid. In other aspects, the polyfunctional carboxylic acid comprises an aliphatic branched difunctional carboxylic acid.

In an aspect, the polyfunctional carboxylic acid comprises an aliphatic linear difunctional carboxylic acid. Examples of aliphatic linear difunctional carboxylic acids suitable for use in the present disclosure include without limitation oxalic acid, malonic acid, succinic acid, glutaric acid, adipic acid, pimelic acid, suberic acid, azelaic acid, sebacic acid, undecanedioic acid, and dodecanedioic acid.

In an aspect, the polyfunctional carboxylic acid is a cycloaliphatic saturated difunctional carboxylic acid. Examples of cycloaliphatic saturated difunctional carboxylic acids suitable for use in the present disclosure include without limitation camphoric acid, 1,2-cyclohexanedicarboxylic acid, 1,3-cyclohexanedicarboxylic acid, 1,4-cyclohexanedicarboxylic acid and norbornane-based dicarboxylic acids.

In an aspect, the polyfunctional carboxylic acid is a cycloaliphatic unsaturated difunctional carboxylic acid. Examples of cycloaliphatic unsaturated difunctional carboxylic acids suitable for use in the present disclosure include without limitation norbornene-based dicarboxylic acids such as cis-norbornene-endo-2,3-dicarboxylic acid and its anhydride derivative cis-norbornene-endo-2,3-dicarboxylic anhydride.

In an aspect, the polyfunctional carboxylic acid comprises mercusic acid. Rosin mainly consists of monocarboxylic acids but it is known that rosin may also contain certain dicarboxylic acids such as mercusic (dihydroagathic) acid (CAS No. 41787-69-3). For example, *Pinus merkusii* is a pine native to Indonesia and the Philippines. Rosin derived from *Pinus merkusii* may contain considerable amounts of mercusic acid. *Pinus latteri* is a pine native to Cambodia and Vietnam. Rosin derived from *Pinus latteri* in general contains mercusic acid.

Reactants based on the polyfunctional carboxylic acid having one or more modified carboxyl groups may be used in place of the polyfunctional carboxylic acid. For example, partial esters and half esters, as described above, may be used in place of polyfunctional carboxylic acid. Other examples include anhydrides, thioesters and carbonyl chlorides, also called acyl chlorides or acid chlorides, which may be substituted for the polyfunctional carboxylic acid. In general these structurally related reactants contain an acyl group that may react with a nucleophile (e.g., the hydroxyl group of a polyhydric alcohol) via a nucleophilic acyl substitution mechanism.

Alternatively, anhydrides may be used as reactants instead of the corresponding polyfunctional carboxylic acid. For example, succinic anhydride, also called dihydro-2,5-furandione, may be applied instead of succinic acid. Analogously, an acid chloride, may be applied as a reactant instead of the corresponding carboxylic acid or may be applied instead of an ester derived from the corresponding carboxylic acid. As another example, methyl adipoyl chloride, also called adipic acid monomethyl ester chloride, may be used in lieu of adipic acid or adipic acid dimethyl ester, adipic acid diethyl ester, adipic acid monomethyl ester, adipic acid monoethyl ester or adipoyl chloride.

In an aspect, the polyfunctional carboxylic acid is a rigid cycloaliphatic dicarboxylic acid. Herein "rigid" refers to the rigidity in molecular structure. The presence of one or more ring structures may increase rigidity. The rotatable bond number is the total number of rotatable bonds in a molecular structure. The total number of rotatable bonds may be applied to describe the degree of rigidity in a molecular structure. While not bound by any particular theory, it is believed that molecular rigidity in general has a relationship with the softening point and glass transition temperature ($T_g$) of a resin such as an REC of the present disclosure. In an aspect the polyfunctional carboxcylic acid is mercusic acid, 1,3-cyclohexanedicarboxylic acid, or combinations thereof.

In an aspect, the cycloaliphatic dicarboxylic acid having 5 to 19 carbon atoms is derived from a cyclopropane, cyclobutane, cyclopentane, cyclopentene, cyclohexane, cyclohexene, cycloheptane, cycloheptene, cyclooctane, cyclooctene, norbornene or norbornane parent ring system.

In an aspect, the average number of rotatable bonds in the cycloaliphatic dicarboxylic acid having 5 to 19 carbon atoms is lower than five, or from about 0 to about 5 rotatable bonds.

In an aspect, the polyfunctional carboxylic acid (or an alternative such as the corresponding anhydride) may be present in a mixture for preparation of the REC in an amount of from about 0.01 wt. % to about 15 wt. %, alternatively from about 0.5 wt. % to about 10 wt. %, or alternatively from about 2 wt. % to about 7 wt. %.

Modified rosin esters based on dienophile or enophile fortified rosins are known and used in several industrial applications including road marking and adhesives. Applied dienophiles or enophiles for this purpose include but are not limited to citraconic acid, mesaconic acid, maleic anhydride, maleic acid, fumaric acid and itaconic acid. The productions of such Diels-Alder or Ene reaction fortified rosin esters requires an additional reaction step, viz. the reaction of a dienophile such as maleic acid (or maleic anhydride) or fumaric acid with rosin prior to the esterification reaction in order to increase molecular weight and carboxyl group functionality. Rosin esters may also be reacted with dienophiles to give such modified rosin esters. Therefore, the application of an additional Diels-Alder reaction step on top of rosin esterification may add additional complexity, production costs, and cycle time to the rosin ester production process. In addition, modified rosin esters based on dienophile or enophile fortified rosins may have a less favorable regulatory status as compared with rosin esters which are lacking such a Diels-Alder reaction step in their production. In an aspect, RECs described here may be prepared by a methodology that lacks such a Diels-Alder reaction step, i.e., there is no addition of dienophiles or enophiles. More comprehensive information on the Diels-Alder reaction, Ene reaction (also known as Alder-ene reaction), enophiles and dienophiles may be found in: M. B. Smith and J. March: Advanced organic chemistry, p. 1103-1105 and p. 1194-1215, $6^{th}$ ed., (2007) John Wiley & Sons, New Jersey which is incorporated herein by reference in its entirety.

In an aspect, RECs may be prepared by any suitable methodology. For example, the RECs described herein may be prepared by an esterification process, wherein the carboxylic acid-containing components of the RECs are esterified with one or more polyhydric alcohols. An esterification reaction of this type is an equilibrium reaction. The removal of the water formed as the reaction proceeds may shift the reaction equilibrium to favor product formation and thereby drive the reaction towards completion. Accordingly, in some aspects, methods for preparing RECs may comprise esterifying a mixture comprising one or more rosins, one or more polycarboxylic acids with one or more polyhydric alcohols to form the RECs. The esterification step may comprise allowing the mixture and the one or more polyhydric alcohols to react for a period of time and under suitable conditions to form the RECs. Optionally, the esterification step may further comprise removing water formed as a by-product of the esterification reaction. Optionally, the esterifying step may comprise contacting the mixture and the one or more polyhydric alcohols with an esterification catalyst (e.g., calcium-bis(((3,5-bis(1,1-dimethylethyl)-4-hydroxyphenyl)methyl)-ethylphosphonate)). In other aspects, the esterifying step may comprise contacting the mixture and the one or more polyhydric alcohols in the absence of an esterification catalyst.

The RECs may also be prepared by a transesterification process. For example, a methyl ester of a rosin acid or a methyl ester of a hydrogenated rosin acid may be reacted with a polyol in a transesterification reaction instead of the corresponding esterification reaction of a rosin acid or a hydrogenated rosin acid with a polyol.

Following the esterification (or transesterification) reaction, unreacted rosin as well as other volatile components may be removed from the resultant REC product, for example, by steam sparging, sparging by an inert gas such as nitrogen gas, wiped film evaporation, short path evaporation, and vacuum distillation. This results in stripping any excess rosin acid from the REC, thereby reducing the acid number. Following esterification (or transesterification), the resultant REC may comprise low amounts of residual materials, such as unreacted rosin acid, decarboxylated rosin acid, and/or unreacted or partly reacted polyalcohol. An REC which is characterized by a low acid number after one of the above mentioned volatiles removal methods may be characterized by a relatively low weight fraction of lower molecular weight species. This property can render it particularly suitable for applications where low migration and/or low volatile organic compounds (VOC) content is beneficial. Examples are food contact applications in adhesives and low-fogging systems.

Reactions for preparation of REC may further include catalysts, bleaching agents, stabilizers, and/or antioxidants. Suitable catalysts, bleaching agents, stabilizers, and antioxidants are described, for example, in U.S. Pat. Nos. 2,729,660, 3,310,575, 3,423,389, 3,780,013, 4,172,070, 4,548,746, 4,690,783, 4,693,847, 4,725,384, 4,744,925, 4,788,009, 5,021,548, and 5,049,652.

In an aspect, an REC of the type disclosed herein is characterized by a softening point of from about 80° C. to about 150° C., alternatively from about 90° C. to about 130° C., or alternatively from about 100° C. to about 120° C. The softening point herein refers to the temperature at which the sample, suspended in a cylindrical cup with a 6.35 mm hole in the bottom and with a stainless steel ball, 8 mm in diameter, centered on top of the sample in the cup, flows downward a distance of 19 mm to interrupt a light beam, as the sample is heated at a linear rate in air. The softening point temperature may be determined by a Ring and Ball method according to ASTM E28-99 (2009).

In an aspect, an REC of the type disclosed herein has a hydroxyl value of less than 56 mg KOH/g, or alternatively from about 6 mg KOH/g to about 45 mg KOH/g, or alternatively from about 7 mg KOH/g to about 40 mg KOH/g. Herein the hydroxyl value refers to the number of milligrams of potassium hydroxide required to neutralize the acetic acid taken up on acetylation of one gram of a chemical substance that contains free hydroxyl groups. The hydroxyl value may be determined by a method according to DIN 53240-2, or a modified procedure thereof.

In an aspect, an REC of the type disclosed herein has a viscosity at 150° C. of from about 1,000 mPa·s to about 100,000 mPa·s, alternatively from about 500 mPa·s to about 50,000 mPa·s, or alternatively from about 1,200 mPa·s to about 10,000 mPa·s, or alternatively from about 1,300 mPa·s to about 3,000 mPa·s.

In an aspect, an REC of the type disclosed herein has a viscosity at 175° C. of from about 200 mPa·s to about 10,000 mPa·s, alternatively from about 270 mPa·s to about 4,000 mPa·s, alternatively from about 270 mPa·s to about 1,000 mPa·s, or alternatively from about 300 mPa·s to about 500 mPa·s.

In an aspect, an REC of the type disclosed herein has a viscosity at 200° C. of from about 70 mPa·s to about 3000 mPa·s, alternatively from about 90 mPa·s to about 1,000 mPa·s, alternatively from about 90 mPa·s to about 200 mPa·s, or alternatively from about 98 mPa·s to about 150 mPa·s.

Viscosity values were determined according to method described in ASTM D2196 entitled "Standard Test Methods for Rheological Properties of Non-Newtonian Materials by Rotational Viscometer". Spindle No. 21 was applied.

In an aspect, an REC of the type disclosed herein is characterized by a third moment or third power average molecular weight $M_z$ of from about 1,000 g/mol to about 12,000 g/mol, alternatively from about 1,200 g/mol to about 7,000 g/mol, or alternatively from about 1,500 g/mol to about 2,500 g/mol as determined by gel permeation chromatograpy. The third moment or third power average molecular weight ($M_z$) is a higher order molecular weight average which is calculated according to Equation 1:

$$M_z = \frac{\Sigma_i N_i M_i^3}{\Sigma_i N_i M_i^2} \quad (1)$$

where N is the amount of substance of species i and $M_i$ is the molecular weight of species i.

In an aspect, an REC of the type disclosed herein is characterized by a weight average molecular weight ($M_w$) of from about 1,000 g/mol to about 4,000 g/mol, alternatively from about 1,100 g/mol to about 3,000 g/mol, or alternatively from about 1,200 g/mol to about 1,700 g/mol as determined by gel permeation chromatograpy. $M_w$ describes the molecular weight average distribution of a resin (e.g., REC) and is calculated according to Equation 2:

$$M_w = \frac{\Sigma_i N_i M_i^2}{\Sigma_i N_i M_i} \quad (2)$$

where $N_i$ is the amount of substance of species i and $M_i$ is the molecular weight of species i.

In an aspect, an REC of the type disclosed herein is characterized by a number average molecular weight ($M_n$) of from about 700 g/mol to about 2,500 g/mol, alternatively from about 800 g/mol to about 1,500 g/mol, or alternatively from about 900 g/mol to about 1,300 g/mol as determined by gel permeation chromatography. $M_n$ describes the molecular number average distribution of a resin (e.g., REC) and is calculated according to Equation 3:

$$M_n = \frac{\Sigma_i N_i M_i}{\Sigma_i N_i} \quad (3)$$

where $N_i$ is the amount of substance of species i and $M_i$ is the molecular weight of species i.

In an aspect, an REC of the type disclosed herein is characterized by a PAN number of less than about 40%, alternatively less than about 20%, or alternatively less than about 15% as determined by a method according to ASTM D5974-00 (2010).

In an aspect, an REC of the type disclosed herein is characterized by an acid number of less than about 40 mg KOH/g, alternatively less than about 20 mg KOH/g, or alternatively less than about 10 mg KOH/g as determined by a method according to ASTM D465-05 (2010). Herein acid number refers to acid value (or "neutralization number" or "acid number" or "acidity") which is the mass of potassium hydroxide (KOH) in milligrams that is required to neutralize one gram of chemical substance.

In an aspect, an REC of the type disclosed herein is characterized by a glass transition temperature of from 30° C. to 100° C., alternatively from 40° C. to 80° C., or alternatively from 44° C. to 70° C. as determined by differential scanning calorimetry.

In some aspects, the REC is prepared by reacting, a polyhydric alcohol and from about 0.01 to about 15 wt % based on the total weight of the reaction mixture, of one or more carboxylic acid functional organic compounds (e.g., polyfunctional carboxylic acid) wherein the one or more carboxylic acid functional organic compounds have an average number of rotatable bonds of equal to less than six.

In some aspects, the REC is prepared by reacting a rosin, a polyhydric alcohol and from about 0.01 wt. % to about 15 wt. % based on the total weight of the reaction mixture, of one or more polyfunctional carboxylic acids wherein the one or more polyfunctional carboxylic acids have an average number of one to six rotatable bonds, e.g. 1, or 2, or 3, or 4, or 5, or 6 rotatable bonds. Herein, the number of rotatable bonds may be different per polyfunctional carboxylic acid used in preparation of the REC in cases wherein more than one polyfunctional carboxylic acid is used.

Without wishing to be limited by theory, the use of polyfunctional carboxylic acids of the type disclosed herein may lead to RECs having an increased softening point value. The number of rotatable bonds is the number of bonds which allow free rotation around themselves. Rotatable bond is defined as any single bond, not in a ring, bound to a nonterminal heavy atom. The term 'heavy' herein means 'non-hydrogen'. Excluded from the count are amide C—N bonds because of their high rotational energy barrier.

For example, an alternative metric of the relative degree of molecular flexibility may be derived by dividing the number of carbon atoms of the polyfunctional carboxylic acid by the number of rotatable bonds. This provides a value of 6/5=1.2 for the linear difunctional carboxylic acid adipic acid and 4/3=1.3 for succinic acid. The values for cyclic difunctional carboxylic acids are in general higher: for example, 8/2=4 for 1,4-cyclohexanedicarboxylic acid and 7/2=3.5 for 1,3-cyclopentanedicarboxylic acid.

In some aspects where the polyfunctional carboxylic acid comprises a cycloaliphatic group, the average number of carbon atoms of the polyfunctional carboxylic acid divided by the average number of rotatable bonds as calculated from their individual weight fraction contributions is higher than two.

In some aspects, the average number of carbon atoms of all of the polyfunctional carboxylic acids, wherein at least one of the polyfunctional carboxylic acids represents a cycloaliphatic polyfunctional acid, divided by the average number of rotatable bonds as calculated from their individual weight fraction contributions is higher than 1.5, alternatively higher than 2.5, or alternatively higher than 3. For example, a mixture based on 40 wt. % adipic acid and 60 wt. % 1,4-cyclohexanedicarboxylic acid provides an average value of 1.2×0.4+4×0.6=2.88.

In some aspects, the REC described herein contains a modified rosin ester wherein the modified rosin ester is obtained by reacting a rosin ester with a non-aromatic dicarboxylic acid of the type described herein.

In some aspects, the REC described herein contains a modified rosin ester wherein the modified rosin ester is obtained by reacting a rosin ester with a non-dienophilic polyfunctional carboxylic acids of the type described herein, such as a saturated non-dienophilic dicarboxylic acid of the type described herein.

RECs of the type disclosed herein may serve as additives in a variety of applications, including pavement marking formulations (e.g., a thermoplastic road marking paint formulation), as tackifiers in hot-melt and pressure-sensitive adhesives, adhesive dispersions such as adhesive aqueous dispersions, modifiers for rubbers and various plastics, emulsifiers for synthetic rubbers, base materials for chewing gum, resins in coating compositions, inks, and sizing agents for paper making, In an aspect, an REC of the type disclosed herein may be used in conjunction with one or more polymers to form an adhesive, such a hot-melt adhesive. The polymer in the adhesives may be any suitable polymer. The polymer may be, for example, a polyacrylate, a polyolefin, a polyamide, a polyvinyl ether, a polyurethane, a polyester, a polyvinyl ester, a copolymer thereof, or a blend thereof. In some cases, the polymer may be derived from one or more ethylenically-unsaturated monomers (e.g., one or more ethylenically-unsaturated monomers are chosen from styrene, ethylene, butadiene, isoprene, (meth)acrylate monomers, vinyl acetate, vinyl ester monomers, and combinations thereof). In some aspects, the polymer may include a copolymer of ethylene and n-butyl acrylate. In some aspects, the polymer may comprise a copolymer of styrene and one or more of isoprene and butadiene. In some aspects, the polymer may include a block copolymer of styrene and one or more of isoprene and butadiene. In some aspects, the polymer may include a hydrogenated block copolymer of styrene and one or more of isoprene and butadiene wherein one or more of isoprene and butadiene are hydrogenated or partly hydrogenated. In certain aspects, the polymer derived from one or more ethylenically-unsaturated monomers comprises a polymer derived from vinyl acetate. Polymers derived from vinyl acetate include polymers derived, at least in part, from polymerization of vinyl acetate monomers. For example, the polymer derived from vinyl acetate may be a homopolymer of vinyl acetate (i.e., polyvinyl acetate; PVA). The polymer derived from vinyl acetate may also be a copolymer of vinyl acetate and one or more additional ethylenically-unsaturated monomers (e.g., poly(ethylene-co-vinyl acetate), EVA).

The hot-melt adhesive may include one or more additional components, including additional tackifiers, waxes, stabilizers (e.g., antioxidants), templating agents, pigments and dyestuffs, plasticizers, and fillers. Hot-melt adhesive compositions in general contain one or more waxes such as a Fischer-Tropsch wax or a paraffin wax. U.S. Pat. No. 8,921,464 B2 to Liu describes wax components that may be applied in hot-melt adhesives. Such waxes include petroleum based waxes, synthetic waxes and naturally occurring waxes such as plant and animal waxes. Waxes include, but are not limited to, paraffin-based waxes, microcrystalline waxes, high density low molecular weight waxes, less refined waxes, highly refined waxes which elicit a sharp melting point, and synthetic Fischer-Tropsch waxes including low melting Fischer-Tropsch waxes and oxidized Fischer-Tropsch waxes. Templating agents are described in U.S. Pat. No. 8,921,464 B2 to Liu et al which is incorporated herein by reference in their entirety.

Hot-melt adhesives include low temperature application hot-melt adhesives which commonly comprise a mixture of ethylene copolymers, such as ethylene n-butyl acrylate (EnBA) copolymers having a high melt flow (MI) index value such as having MI values of, e.g., 750 grams/10 minutes or higher. Low temperature application hot-melt adhesives include blends comprising an EnBA copolymer such as a blend with an poly(ethylene-co-vinyl acetate (EVA) copolymer, that may lead to hot-melt adhesives which may be applied at temperatures of from about 100° C. to about 150° C. Such low temperature application hot-melt adhesives may contain other co-polymers such as ethylene ethylhexyl acrylate, an ethylene-ethyl acrylate, an ethylene-methyl acrylate, and combinations thereof having good bond strength with exceptional toughness, good heat resistance and acceptable application viscosity.

In some aspects, the REC may be a component of a tire treads composition comprising a rubber polymer (e.g., a copolymer derived from styrene and one or more of isoprene and butadiene) and a filler. An REC of the type disclosed herein may be present in the tire tread composition in an amount of from 1 to 80 parts by weight (e.g., from 2 to 75 parts by weight, from 5 to 70 parts by weight, from 35 to 75 parts by weight, or from 55 to 75 parts by weight), based on 100 parts by weight of the rubber polymer.

In an aspect, a composition may include (a) 1% by weight to 60% by weight, based on the total weight of the composition, of a polymer or polymer blend; and (b) 1% by weight to 60% by weight, based on the total weight of the composition, of an oligoester composition derived from one or more rosins; one or more polyhydric alcohols; and one or more polyfunctional carboxylic acids; wherein at least one of the polyfunctional carboxylic acids represents a cycloaliphatic polyfunctional carboxylic acids having 5 to 19 carbon atoms, and wherein the one or more polyfunctional carboxylic acids is present in a mixture for preparation of the oligoester composition in an amount of from more than zero up to about 15 wt. %, based on the weight of all reactants.

A thermoplastic road marking composition may include (a) up to 20% by weight, based on the total weight of the thermoplastic road marking composition, of polymer; and (b) 5% by weight to 30% by weight, based on the total weight of the thermoplastic road marking composition, of an oligoester composition derived from one or more rosins; one or more polyhydric alcohols; and one or more polyfunctional carboxylic acids; wherein at least one of the polyfunctional carboxylic acids represents a cycloaliphatic polyfunctional carboxylic acid having 5 to 19 carbon atoms, and wherein the one or more polyfunctional carboxylic acids is present in a mixture for preparation of the oligoester composition in an amount of from more than zero up to about 15 wt. %, based on the weight of all reactants.

A thermoplastic road marking composition can comprise (a) up to 20% by weight, based on the total weight of the thermoplastic road marking composition, of polymer; and (b) 5% by weight to 30% by weight, based on the total weight of the thermoplastic road marking composition, of an oligoester composition derived from one or more tall oil based rosins; one or more polyhydric alcohols; and one or more dicarboxylic acids; wherein at least one of the dicarboxylic acids represents a cycloaliphatic dicarboxylic acid having 5 to 19 carbon atoms, wherein the one or more dicarboxylic acids is present in a mixture for preparation of the oligoester composition in an amount of from more than zero up to about 15 wt. %, based on the weight of all reactants, and wherein in the dicarboxylic acid molecular formula the number of hydrogen atoms is higher than the number of carbon atoms.

An adhesive composition can comprise (a) 10% by weight up to 60% by weight, based on the total weight of the adhesive composition, of polymer; and (b) 5% by weight to 60% by weight, based on the total weight of the adhesive composition, of an oligoester composition derived from one or more rosins; one or more polyhydric alcohols; and one or more polyfunctional carboxylic acids; wherein at least one of the polyfunctional carboxylic acids represents a cycloaliphatic polyfunctional carboxylic acid having 5 to 19 carbon atoms, and wherein the one or more polyfunctional carboxylic acids is present in a mixture for preparation of the oligoester composition in an amount of from more than zero up to about 15 wt. %, based on the weight of all reactants.

An adhesive composition can comprise (a) 10% by weight up to 60% by weight, based on the total weight of the adhesive composition, of polymer; and (b) 5% by weight to 60% by weight, based on the total weight of the adhesive composition, of an oligoester composition derived from one or more tall oil based rosins; one or more polyhydric alcohols; and one or more dicarboxylic acids; wherein at least one of the dicarboxylic acids represents a cycloaliphatic dicarboxylic acid having 5 to 19 carbon atoms, wherein the one or more dicarboxylic acids is present in a mixture for preparation of the oligoester composition in an amount of from more than zero up to about 15 wt. %, based on the weight of all reactants, and wherein in the dicarboxylic acid molecular formula the number of hydrogen atoms is higher than the number of carbon atoms.

A hot-melt adhesive composition can comprise (a) 20% by weight up to 50% by weight, based on the total weight of the hot-melt adhesive composition, of polymer; (b) 10% by weight to 60% by weight of an oligoester composition derived from one or more tall oil based rosins; one or more polyhydric alcohols; and one or more dicarboxylic acids; wherein at least one of the dicarboxylic acids represents a cycloaliphatic dicarboxylic acid having 5 to 19 carbon atoms, wherein the one or more dicarboxylic acids is present in a mixture for preparation of the oligoester composition in an amount of from more than zero up to about 15 wt. %, based on the weight of all reactants, and wherein in the dicarboxylic acid molecular formula the number of hydrogen atoms is higher than the number of carbon atoms; and (c) 5% by weight to 35% by weight, based on the total weight of the hot-melt adhesive composition, of one or more waxes.

A method for preparing an adhesive composition can comprise mixing one or more polymers and an oligoester composition, wherein the oligoester composition is derived from one or more tall oil based rosins; one or more polyhydric alcohols; and one or more dicarboxylic acids; wherein at least one of the dicarboxylic acids represents a cycloaliphatic dicarboxylic acid having 5 to 19 carbon atoms, wherein the one or more dicarboxylic acids is present in a mixture for preparation of the oligoester composition in an amount of from more than zero up to about 15 wt. %, based on the weight of all reactants, and wherein in the dicarboxylic acid molecular formula the number of hydrogen atoms is higher than the number of carbon atoms.

A method for preparing a thermoplastic road marking composition can comprise mixing one or more polymers and an oligoester composition, wherein the oligoester composition is derived from one or more tall oil based rosins; one or more polyhydric alcohols; and one or more dicarboxylic acids; wherein at least one of the dicarboxylic acids represents a cycloaliphatic dicarboxylic acid having 5 to 19 carbon atoms, wherein the one or more dicarboxylic acids is present in a mixture for preparation of the oligoester composition in an amount of from more than zero up to about 15 wt. %, based on the weight of all reactants, and wherein in the dicarboxylic acid molecular formula the number of hydrogen atoms is higher than the number of carbon atoms.

A method for preparing a hot-melt adhesive composition can comprise mixing one or more polymers, one or more waxes, and an oligoester composition, wherein the oligoester composition is derived from one or more tall oil based rosins; one or more polyhydric alcohols; and one or more dicarboxylic acids; wherein at least one of the dicarboxylic acids represents a cycloaliphatic dicarboxylic acid having 5 to 19 carbon atoms, wherein the one or more dicarboxylic acids is present in a mixture for preparation of the oligoester composition in an amount of from more than zero up to about 15 wt. %, based on the weight of all reactants, and wherein in the dicarboxylic acid molecular formula the number of hydrogen atoms is higher than the number of carbon atoms.

A method for preparing a tire tread composition can comprise mixing one or more rubber polymers, one or more fillers, and an oligoester composition, wherein the oligoester composition is derived from one or more tall oil based rosins; one or more polyhydric alcohols; and one or more dicarboxylic acids; wherein at least one of the dicarboxylic acids represents a cycloaliphatic dicarboxylic acid having 5 to 19 carbon atoms, wherein the one or more dicarboxylic acids is present in a mixture for preparation of the oligoester composition in an amount of from more than zero up to about 15 wt. %, based on the weight of all reactants, and wherein in the dicarboxylic acid molecular formula the number of hydrogen atoms is higher than the number of carbon atoms.

A tire tread composition can comprise (a) a rubber polymer; (b) a filler; and (c) 1 to 80 parts by weight, based on 100 parts by weight of the rubber polymer, of an oligoester composition derived from one or more rosins; one or more polyhydric alcohols; and one or more polyfunctional carboxylic acids; wherein at least one of the polyfunctional carboxylic acids represents a cycloaliphatic polyfunctional carboxylic acid having 5 to 19 carbon atoms, and wherein the one or more polyfunctional carboxylic acids is present in a mixture for preparation of the oligoester composition in an amount of from more than zero up to about 15 wt. %, based on the weight of all reactants.

A tire tread composition can comprise (a) a rubber polymer; (b) a filler, and (c) 5 to 70 parts by weight, based on 100 parts by weight of the rubber polymer, of an oligoester composition derived from one or more tall oil rosins; one or more polyhydric alcohols; and one or more dicarboxylic acids; wherein at least one of the dicarboxylic acids represents a cycloaliphatic dicarboxylic acid having 5 to 19 carbon atoms, wherein the one or more dicarboxylic acids is present in a mixture for preparation of the oligoester composition in an amount of from more than zero up to about 15 wt. %, based on the weight of all reactants, and wherein in the dicarboxylic acid molecular formula the number of hydrogen atoms is higher than the number of carbon atoms.

A tire tread composition can comprise (a) a copolymer derived from styrene and one or more monomers selected from the group consisting of isoprene and butadiene; (b) a filler; and (c) 5 to 70 parts by weight, based on 100 parts by weight of the copolymer, of an oligoester composition derived from one or more tall oil rosins; one or more polyhydric alcohols; and one or more dicarboxylic acids; wherein at least one of the dicarboxylic acids represents a cycloaliphatic dicarboxylic acid having 5 to 19 carbon atoms, wherein the one or more dicarboxylic acids is present in a mixture for preparation of the oligoester composition in an amount of from more than zero up to about 15 wt. %, based on the weight of all reactants, and wherein in the dicarboxylic acid molecular formula the number of hydrogen atoms is higher than the number of carbon atoms.

In an aspect, a method of making an oligoester composition can comprise contacting one or more rosins and one or more polyfunctional carboxylic acids with one or more alcohols at a temperature of at least 150° C. to produce a reaction mixture, wherein at least one of the polyfunctional carboxylic acids represents a cycloaliphatic polyfunctional carboxylic acid having 5 to 19 carbon atoms; and esterifying the reaction mixture at a maximum temperature of 300° C. in the absence or presence of an esterification catalyst, and in the presence or absence of a disproportionation catalyst. In such aspect, the oligoester composition is derived from t tall oil rosin, wood rosin, gum rosin, hydrogenated rosin, hydrogenated gum rosin, disproportionated rosin, partly disproportionated rosin, or combinations thereof. The disproportionation catalyst is contacted with the reaction mixture in an amount of more than 0.05 wt. % disproportionation catalyst, based on the total weight of the reaction mixture.

EXAMPLES

The following examples are given as particular aspect of the present disclosures of the present disclosure and to demonstrate the practice and advantages thereof. It is understood that the examples are given by way of illustration and are not intended to limit the specification or the claims to follow in any manner.

All materials were characterized using the following methods unless otherwise stated. Hydroxyl numbers were determined according to a modified method (different solvent tetrahydrofuran was applied) of DIN 53240-2 entitled "Determination of Hydroxyl Value—Part 2: Method with Catalyst," which is incorporated herein by reference in its entirety. The oligoester (dissolved in tetrahydrofuran) was reacted with acetic anhydride in the presence of 4-dimethylaminopyridine. Residual acetic anhydride was hydrolyzed and the resulting mixture titrated with an alcoholic solution of potassium hydroxide (0.5 M). Acid numbers were determined according to method described in ASTM D465-05 (2010) entitled "Standard Test Methods for Acid Number of Naval Stores Products Including Tall Oil and Other Related Products," which is incorporated herein by reference in its entirety. Softening points were determined according to method described in ASTM E28-99 (2009) entitled "Standard Test Methods for Softening Point of Resins Derived from Naval Stores by Ring-and-Ball Apparatus," which is incorporated herein by reference in its entirety. PAN numbers and dehydroabietic acid content were determined according to method described in ASTM D5974-00 (2010) entitled "Standard Test Methods for Fatty and Rosin Acids in Tall Oil Fractionation Products by Capillary Gas Chromatography," which is incorporated herein by reference in its entirety. Specifically, a sample (1.00 g) and 10 mL 2N potassium hydroxide (KOH) in ethanol were added to a high pressure microwave reaction vessel. The reaction vessel was sealed and placed into the rotor of a Perkin Elmer MULTI-WAVE™ 3000 Microwave System. The sample was saponified in the microwave for 30 minutes at 150° C. Upon completion of the microwave-assisted saponification, the reaction mixture was transferred to a separatory funnel, and dilute hydrochloric acid was added to reduce the pH value to less than 4. This converted the rosin soaps in the reaction mixture to rosin acids. The resulting rosin acids were isolated by way of diethyl ether extraction. Upon removal of the diethyl ether solvent, the rosin acids were derivatized and analyzed using a gas chromatograph according to ASTM D5974-00 (2010). The Gardner color of all materials was measured according to the Gardner Color scale as specified in ASTM D1544-04 (2010) entitled "Standard Test Method for Color of Transparent Liquids (Gardner Color Scale)," which is incorporated herein by reference in its entirety. Gardner colors were measured neat using a Dr Lange LICO® 200 colorimeter. Molecular weight distributions and the derived $M_n$, $M_w$, and $M_z$ values of the oligoesters were determined by means of Gel permeation chromatography (GPC): Equipment description: Viscotek GPC-Max equipped with a Viscotek TDA305 triple detector array was applied. Column set description: PL-gel Guard column (3 μm, 50×7.5 mm, cat. No. PL1110-1320) and 3 times PL-gel Mixed E (3 μm, 300×7.5 mm, cat. No. PL110-6300) was applied. Tetrahydrofuran (Biosolve AR-grade, stabilized with 0.02-0.03% 2,6-di-tert-butyl-4-methylphenol (BHT), cat. No. 20630502) was applied as eluent. The applied flow rate was 1.0 ml/min. The applied temperature was 40° C. Sample preparation description: About 30 mg of sample was exactly weighted and dissolved in 10.0 ml of eluent, 10.0 μl of toluene was added as a flow rate marker. The applied injection volume was 100 μl. Calibration description: Conversional calibration against eight polystyrene standards in the range of from about 162 Da to about 51,000 Da was applied. Glass transition temperature (Tg) values of the oligoesters were determined by means of Differential scanning calorimetry (DSC): Equipment description: Mettler Toledo DSC 821e equipped with an ULSP 130 immersion probe cooler. Cup description: 40 μl aluminum cup with pierced lid. Applied gas and flow rate: $N_2$, 65 ml/min. Temperature program description (Basic temperature program; heating and cooling rates were standard, actual minimum and maximum temperatures can be modified on demand): (i) 1st. segment: 25° C. to 160° C. (20° C./min); (ii) 2nd. Segment: 160° C. to −60° C. (−10° C./min); and (iii) 3rd. segment: −60° C. to 160° C. (10° C./min).

Sample intake amount: Approximately 10 mg. Processing description: The glass transition temperature (Tg) is determined in the 3rd segment (i.e., the 2nd heating curve). Viscosity values were determined according to method described in ASTM D2196 entitled "Standard Test Methods for Rheological Properties of Non-Newtonian Materials by Rotational Viscometer". Spindle No. 21 was applied.

Example 1

Tall oil rosin (600 grams, having an acid number of 175 mg KOH/g rosin) was charged into a four-necked flask (1 L), equipped with temperature controller, $N_2$ inlet and mechanical stirrer and connected with a low condenser bridge, and heated to 190° C. under a nitrogen atmosphere. After the rosin was completely melted, the resulting solution was stirred. Pentaerythritol (68.027 g) and Lowinox™ TBM-6 (0.6 g) were added. At 180° C., adipic acid (12.0 g) was added. The reaction mixture was heated to 180° C. and subsequently to 285° C. (heating rates: 180° C. to 200° C., 15° C./hour; 200° C. to 230° C., 30° C./hour, 230° C. to 250° C., 20° C./hour; 250° C. to 285° C., 10° C./hour). At 285° C. a 50% magnesium acetate tetrahydrate solution in water (1.8 g) was added dropwise. The formed water was allowed to escape as vapor during the esterification reaction. After 5 hours at 285° C., residual rosin acids and other volatiles were stripped off during two hours of nitrogen sparging and the reaction mixture was subsequently cooled to 190° C. Irganox™ 565 (0.480 g was added) and the reaction mixture was discharged after 15 minutes of agitation. The obtained oligoester 1 exhibited a softening point of 96.7° C., an acid number of 6.5 mg KOH/g oligoester, a hydroxyl number of 8.6 mg KOH/g oligoester, an Mz value of 1885 g/mol, an Mw value of 1452 g/mol, an Mn value of 1115 g/mol, an Tg of 50.3° C., a color of 6.3 Gardner (neat) and a viscosity of 1352 mPa·s at 150° C., 262 mPa·s at 175° C. and 86 mPa·s at 200° C.

Example 2

Tall oil rosin (600 grams, having an acid number of 175 mg KOH/g rosin) was charged into a four-necked flask (1 L), equipped with temperature controller, $N_2$ inlet and mechanical stirrer and connected with a low condenser bridge, and heated to 190° C. under a nitrogen atmosphere. After the rosin was completely melted, the resulting solution was stirred. Pentaerythritol (69.554 g) and Lowinox™ TBM-6 (0.6 g) were added. At 180° C. 1,4-cyclohexanedicarboxylic acid (18.0 g) was added. The reaction mixture was heated to 180° C. and subsequently to 285° C. (heating rates: 180° C. to 200° C., 15° C./hour; 200° C. to 230° C., 30° C./hour, 230° C. to 250° C., 20° C./hour; 250° C. to 285° C., 10° C./hour). At 285° C. a 50% magnesium acetate tetrahydrate solution in water (1.8 gram) was added dropwise. The formed water was allowed to escape as vapor during the esterification reaction. After 5 hours at 285° C., residual rosin acids and other volatiles were stripped off during two hours of nitrogen sparging and the reaction mixture was subsequently cooled to 190° C. Irganox™ 565 (0.480 g was added) and the reaction mixture was discharged after 15 minutes of agitation. The obtained oligoester 2 exhibited a softening point of 101.2° C., an acid number of 8.3 mg KOH/g oligoester, a hydroxyl number of 7.4 mg KOH/g oligoester, an Mz value of 2199 g/mol, an Mw value of 1595 g/mol, an Mn value of 1138 g/mol, an Tg of 53.3° C., a color of 6.2 Gardner (neat) and a viscosity of 2218 mPa·s at 150° C., 385 mPa·s at 175° C. and 119 mPa·s at 200° C.

Example 3

Tall oil rosin (600 grams, having an acid number of 175 mg KOH/g rosin) was charged into a four-necked flask (1 L), equipped with temperature controller, $N_2$ inlet and mechanical stirrer and connected with a low condenser bridge, and heated to 190° C. under a nitrogen atmosphere. After the rosin was completely melted, the resulting solution was stirred. Pentaerythritol (67.182 g) and Lowinox™ TBM-6 (0.6 g) were added. At 180° C. 1,4-cyclohexanedicarboxylic acid (12.0 g) was added. The reaction mixture was heated to 180° C. and subsequently to 285° C. (heating rates: 180° C. to 200° C., 15° C./hour; 200° C. to 230° C., 30° C./hour, 230° C. to 250° C., 20° C./hour; 250° C. to 285° C., 10° C./hour). At 285° C. a 50% magnesium acetate tetrahydrate solution in water (1.8 gram) was added dropwise. The formed water was allowed to escape as vapor during the esterification reaction. After 5 hours at 285° C., residual rosin acids and other volatiles were stripped off during two hours of nitrogen sparging and the reaction mixture was subsequently cooled to 190° C. Irganox™ 565 (0.480 g was added) and the reaction mixture was discharged after 15 minutes of agitation. The obtained oligoester 3 exhibited a softening point of 99.6° C., an acid number of 6.8 mg KOH/g oligoester, a hydroxyl number of 8.1 mg KOH/g oligoester, an $M_z$ value of 1949 g/mol, an $M_w$ value of 1493 g/mol, an $M_n$ value of 1132 g/mol, an $T_g$ of 51.8° C., a color of 6.5 Gardner (neat) and a viscosity of 1755 mPa·s at 150° C., 317 mPa·s at 175° C. and 99 mPa·s at 200° C.

Example 4

Tall oil rosin (600 grams, having an acid number of 175 mg KOH/g rosin) was charged into a four-necked flask (1 L), equipped with temperature controller, $N_2$ inlet and mechanical stirrer and connected with a low condenser bridge, and heated to 195° C. under a nitrogen atmosphere. After the rosin was completely melted, the resulting solution was stirred. Pentaerythritol (69.554 g), Rosinox™ (1.2 g) and Irganox™ 1425 (1.2 g) were added. At 180° C. 1,4-cyclohexanedicarboxylic acid (18.0 g) was added. The reaction mixture was heated to 180° C. and subsequently to 285° C. (heating rates: 180° C. to 200° C., 15° C./hour; 200° C. to 230° C., 30° C./hour, 230° C. to 250° C., 20° C./hour; 250° C. to 285° C., 10° C./hour). The formed water was allowed to escape as vapor during the esterification reaction. After 5 hours at 285° C., residual rosin acids and other volatiles were stripped off during two hours of nitrogen sparging and the reaction mixture was subsequently cooled to 190° C. Irganox™ 565 (0.480 g was added) and the reaction mixture was discharged after 15 minutes of agitation. The obtained oligoester 4 exhibited a softening point of 97.8° C., an acid number of 7.1 mg KOH/g oligoester, $M_z$ value of 2216 g/mol, $M_w$ value of 1622 g/mol, $M_n$ value of 1179 g/mol, Tg of 51.8° C., and a color of 4.6 Gardner (neat).

Example 5

Tall oil rosin (600 grams, having an acid number of 179 mg KOH/g rosin) was charged into a four-necked flask (1 L), equipped with temperature controller, $N_2$ inlet and mechanical stirrer and connected with a low condenser bridge, and heated to 190° C. under a nitrogen atmosphere. After the rosin was completely melted, the resulting solution was stirred. Pentaerythritol (68.57 g) and Lowinox™ TBM-6 (0.6 g) were added. At 180° C. 1,4-cyclohexanedicarboxylic acid (12.0 g) was added. The reaction mixture was heated to 180° C. and subsequently to 285° C. (heating rates: 180° C. to 200° C., 15° C./hour; 200° C. to 230° C., 30° C./hour, 230° C. to 250° C., 20° C./hour; 250° C. to 285° C., 10° C./hour). At 285° C. a 50% magnesium acetate tetrahydrate solution in water (1.8 gram) was added dropwise. The formed water was allowed to escape as vapor during the esterification reaction. After 5 hours at 285° C., residual rosin acids and other volatiles were stripped off during two hours of nitrogen sparging and the reaction mixture was subsequently cooled to 190° C. Irganox™ 565 (0.480 g was added) and the reaction mixture was discharged after 15 minutes of agitation. The obtained oligoester 5 exhibited a softening point of 106.6° C., an acid number of 4.2 mg KOH/g oligoester, an Mz value of 1992 g/mol, an Mw value of 1519 g/mol, an Mn value of 1190 g/mol and a color of 6.4 Gardner (neat).

Example 6

Tall oil rosin (600 grams, having an acid number of 179 mg KOH/g rosin) was charged into a four-necked flask (1 L), equipped with temperature controller, $N_2$ inlet and mechanical stirrer and connected with a low condenser bridge, and heated to 190° C. under a nitrogen atmosphere. After the rosin was completely melted, the resulting solution was stirred. Pentaerythritol (70.94 g) and Lowinox™ TBM-6 (0.6 g) were added. At 180° C. 1,4-cyclohexanedicarboxylic acid (18.0 g) was added. The reaction mixture was heated to 180° C. and subsequently to 285° C. (heating rates: 180° C. to 200° C., 15° C./hour; 200° C. to 230° C., 30° C./hour, 230° C. to 250° C., 20° C./hour; 250° C. to 285° C., 10° C./hour). At 285° C. a 50% magnesium acetate tetrahydrate solution in water (1.8 gram) was added dropwise. The formed water was allowed to escape as vapor during the esterification reaction. After 5 hours at 285° C., residual rosin acids and other volatiles were stripped off during two hours of nitrogen sparging and the reaction mixture was subsequently cooled to 190° C. Irganox™ 565 (0.480 g was added) and the reaction mixture was discharged after 15 minutes of agitation. The obtained oligoester 6 exhibited a softening point of 108.3° C., an acid number of 4.3 mg KOH/g oligoester, a hydroxyl number of 6.2 mg KOH/g oligoester, an Mz value of 2372 g/mol, an Mw value of 1710 g/mol, an Mn value of 1280 g/mol and a color of 6.6 Gardner (neat).

Example 7

Tall oil rosin (300 grams, having an acid number of 180 mg KOH/g rosin) was charged into a four-necked flask (0.5 L), equipped with temperature controller, $N_2$ inlet and mechanical stirrer and connected with a low condenser bridge, and heated to 190° C. under a nitrogen atmosphere. After the rosin was completely melted, the resulting solution was stirred.

Pentaerythritol (40.49 g), Rosinox™ (0.72 g), Irganox™ 1425 (0.72 g) and 1,4-cyclohexanedicarboxylic acid (21.0 g) were added. The reaction mixture was heated to 180° C. and subsequently to 285° C. (heating rates: 180° C. to 200° C., 15° C./hour; 200° C. to 230° C., 30° C./hour, 230° C. to 250° C., 20° C./hour; 250° C. to 285° C., 10° C./hour). The formed water was allowed to escape as vapor during the esterification reaction. After 5 hours at 285° C., residual rosin acids and other volatiles were stripped off during one hour of nitrogen sparging and the reaction mixture was subsequently cooled to 200° C. and discharged. The obtained oligoester 7 exhibited a softening point of 125.9° C., an acid number of 1.3 mg KOH/g oligoester, an Mz value of 6175 g/mol, an Mw value of 2987 g/mol, an Mn value of 1698 g/mol, a color of 6.2 Gardner (neat) and a viscosity of 44300 mPa·s at 150° C., 3554 mPa·s at 175° C. and 645 mPa·s at 200° C.

Example 8

Tall oil rosin (300 grams, having an acid number of 175 mg KOH/g rosin) was charged into a four-necked flask (0.5 L), equipped with temperature controller, $N_2$ inlet and mechanical stirrer and connected with a low condenser bridge, and heated to 195° C. under a nitrogen atmosphere. After the rosin was completely melted, the resulting solution was stirred.

Glycerol (42.44 g), Rosinox™ (0.72 g), Irganox™ 1425 (0.72 g) and 1,4-cyclohexanedicarboxylic acid (30.0 g) were added. The reaction mixture was heated to 180° C. and subsequently to 275° C. (heating rates: 180° C. to 200° C., 15° C./hour; 200° C. to 320° C., 30° C./hour, 230° C. to 275° C., 20° C./hour). The formed water was allowed to escape as vapor during the esterification reaction. After 8 hours at 275° C., residual rosin acids and other volatiles were stripped off during one hour of nitrogen sparging and the reaction mixture was subsequently cooled to 190° C. and discharged. The obtained oligoester 8 exhibited a softening point of 91.4° C., an acid number of 9.6 mg KOH/g oligoester, an Mz value of 2468 g/mol, an Mw value of 1558 g/mol, an Mn value of 1039 g/mol, an Tg of 45.0° C. and a color of 3.2 Gardner (neat).

Example 9

Tall oil rosin (300 grams, having an acid number of 180 mg KOH/g rosin) was charged into a four-necked flask (0.5 L), equipped with temperature controller, $N_2$ inlet and mechanical stirrer and connected with a low condenser bridge, and heated to 195° C. under a nitrogen atmosphere. After the rosin was completely melted, the resulting solution was stirred.

Glycerol (39.584 g), Lowinox™ TBM-6 (0.6 g), Irganox™ 1425 (0.6 g) and cis-5-Norbornene-endo-2,3-dicarboxylic acid (21.0 g) were added. The reaction mixture was heated to 180° C. and subsequently to 275° C. (heating rates: 180° C. to 200° C., 15° C./hour; 200° C. to 275° C., 30° C./hour). The formed water was allowed to escape as vapor during the esterification reaction. After 8 hours at 275° C., residual rosin acids and other volatiles were stripped off during two hours of nitrogen sparging and the reaction mixture was subsequently cooled to 190° C. and discharged.

The obtained oligoester 9 exhibited a softening point of 104.7° C., an acid number of 9.4 mg KOH/g oligoester, an Mz value of 2124 g/mol, an Mw value of 1350 g/mol, an Mn value of 1000 g/mol and an Tg of 60.2° C.

Example 10

Tall oil rosin (300 grams, having an acid number of 180 mg KOH/g rosin) was charged into a four-necked flask (0.5 L), equipped with temperature controller, $N_2$ inlet and mechanical stirrer and connected with a low condenser bridge, and heated to 195° C. under a nitrogen atmosphere. After the rosin was completely melted, the resulting solution was stirred. Trimethylolpropane (50.3 g) and 1,4-cyclohexanedimethanol (13.9 g) were added. At 180° C. Lowinox™ TBM-6 (0.6 g), Irganox™ 1425 (0.6 g), 1,3-cyclohexanedicarboxylic acid (15.0 g), camphoric acid (6.0 g) and cis,cis,cis,cis-1,2,3,4-cyclopentanetetracarboxylic acid (1.5 g) were added. The reaction mixture was heated to 180° C. and subsequently to 275° C. (heating rates: 180° C. to 200° C., 15° C./hour; 200° C. to 275° C., 30° C./hour. The formed water was allowed to escape as vapor during the esterification reaction. After 8 hours at 275° C., residual rosin acids and other volatiles were stripped off during two hours of nitrogen sparging and the reaction mixture was subsequently cooled to 190° C. and discharged. The obtained oligoester 10 exhibited a softening point of 95.1° C., an acid number of 7.4 mg KOH/g oligoester, a hydroxyl number of 10.4 mg KOH/g oligoester, an Mz value of 2315 g/mol, an Mw value of 1448 g/mol, an Mn value of 985 g/mol, an Tg of 48.3° C. and a viscosity of 1022 mPa·s at 150° C., 217 mPa·s at 175° C. and 74 mPa·s at 200° C.

Example 11

Tall oil rosin (300 grams, having an acid number of 175 mg KOH/g rosin) was charged into a four-necked flask (0.5 L), equipped with temperature controller, $N_2$ inlet and mechanical stirrer and connected with a low condenser bridge, and heated to 195° C. under a nitrogen atmosphere. After the rosin was completely melted, the resulting solution was stirred. Pentaerythritol (38.101 g), Lowinox™ TBM-6 (0.6 g) and Irganox™ 1425 (0.6 g) were added. At 180° C. camphoric acid (9.0 g) was added. The reaction mixture was heated to 180° C. and subsequently to 285° C. (heating rates: 180° C. to 200° C., 15° C./hour; 200° C. to 230° C., 30° C./hour; 230° C. to 250° C., 20° C./hour; 250° C. to 285° C., 10° C./hour). The formed water was allowed to escape as vapor during the esterification reaction. After 5 hours at 285° C., residual rosin acids and other volatiles were stripped off during two hours of nitrogen sparging and the reaction mixture was subsequently cooled to 190° C. The obtained oligoester 11 exhibited a softening point of 101.6° C. and an acid number of 4.0 mg KOH/g oligoester.

Example 12

Tall oil rosin (300 grams, having an acid number of 174 mg KOH/g rosin) was charged into a four-necked flask (0.5 L), and heated to 190° C. under a nitrogen atmosphere. After the rosin was completely melted, the resulting solution was stirred. Pentaerythritol (40.50 g), Rosinox™ (0.6 g), Irganox™ 1425 (0.6 g), adipic acid (4.5 g) and 1,4-cyclohexanedicarboxylic acid (9.0 g) were added. The reaction mixture was heated to 200° C. and subsequently to 275° C. (heating rate: 200° C. to 275° C., 30° C./hour). The formed water was allowed to escape as vapor during the esterification reaction. After 8 hours at 275° C., residual rosin acids and other volatiles were stripped off during two hours of nitrogen sparging and the reaction mixture was subsequently cooled to 200° C. and discharged. The obtained oligoester 12 exhibited a softening point of 102.1° C., an acid number of 1.6 mg KOH/g oligoester, a hydroxyl number of 15.6 mg KOH/g oligoester, an Mz value of 2541 g/mol, an Mw value of 1745 g/mol, an Mn value of 1271 g/mol, an Tg of 54.3° C. and a color of 4.9 Gardner (neat).

ADDITIONAL DISCLOSURE

The following enumerated aspects of the present disclosure are provided as nonlimiting examples.

Claim 1: In a first aspect an oligoester composition is derived from one or more rosins, one or more polyhydric alcohols, and one or more poly-functional carboxylic acids comprising aliphatic dicarboxylic acids, wherein at least one of the aliphatic dicarboxylic acids comprises a cycloaliphatic dicarboxylic acid having 5 to 19 carbon atoms.

Claim 2: An oligoester composition derived from one or more rosins, one or more polyhydric alcohols, and one or more polyfunctional carboxylic acids comprising saturated dicarboxylic acids, wherein at least one of the dicarboxylic acids comprises a cycloaliphatic dicarboxylic acid having 5 to 19 carbon atoms, and wherein the total of dicarboxylic acids amounts from more than zero up to 15 wt. %, by weight of all reactants.

Claim 3: The composition of any preceding claim, wherein the oligoester is derived from an alcohol, a rosin, and from about 0.01 wt. % to about 15 wt. %, based on the weight of all reactants, of a polyfunctional carboxylic acid comprising one or more dicarboxylic acids; wherein at least one of the dicarboxylic acids represents a cycloaliphatic dicarboxylic acid having 5 to 19 carbon atoms; and wherein in the dicarboxylic acid molecular formula the number of hydrogen atoms is higher than the number of carbon atoms, or wherein one of the dicarboxylic acids represents oxalic acid.

Claim 4: The composition of any preceding claim, wherein the oligoester is derived from an alcohol, a rosin, and from about 0.01 wt. % to about 15 wt. %, based on the weight of all reactants present in a mixture for preparation of the oligoester, of a polyfunctional carboxylic acid comprising one or more saturated dicarboxylic acids; wherein at least one of the saturated dicarboxylic acids represents a cycloaliphatic dicarboxylic acid having 5 to 19 carbon atoms; and wherein in the dicarboxylic acid molecular formula the number of hydrogen atoms is higher than the number of carbon atoms.

Claim 5: The composition of claim 1 wherein the average number of rotatable bonds of the cycloaliphatic polyfunctional carboxylic acid having 5 to 19 carbon atoms is lower than five.

Claim 6: The composition of any preceding claim wherein the ratio of the average number of carbon atoms of the polyfunctional carboxylic acid and the average number of rotatable bonds of the polyfunctional carboxylic acid is higher than 1.5.

Claim 7: The composition of any preceding claim wherein the polyfunctional carboxylic acid comprises a cycloaliphatic polyfunctional carboxylic acid, and wherein the ratio of the average number of carbon atoms of the cycloaliphatic polyfunctional carboxylic acid and the average number of rotatable bonds of the cycloaliphatic polyfunctional carboxylic acid is higher than 3.

Claim 8: The composition of any preceding claim wherein the ratio of the average number of carbon atoms of the polyfunctional carboxylic acid and the average number of rotatable bonds is higher than 2.

Claim 9: The composition of claim 9 wherein the polyfunctional carboxylic acid comprises a cycloaliphatic polyfunctional carboxylic acid, and wherein the ratio of the average number of carbon atoms of the cycloaliphatic polyfunctional carboxylic acid and the average number of rotatable bonds of the cycloaliphatic polyfunctional carboxylic acid is higher than 2.

Claim 10: The composition of any preceding claim wherein the one or more polyfunctional carboxylic acids is present in a mixture for preparation of the oligoester composition in an amount of from about 1 wt. % to about 10 wt. %, based on the weight of all reactants.

Claim 11: The composition of any preceding claim wherein the one or more polyfunctional carboxylic acids is present in a mixture for preparation of the oligoester composition in an amount of from about 2 wt. % to about 7 wt. %, based on the weight of all reactants.

Claim 12: The composition of any preceding claim wherein the polyfunctional carboxylic acid comprises a cycloaliphatic dicarboxylic acid having 5 to 19 carbon atoms, wherein the cycloaliphatic dicarboxylic acid having 5 to 19 carbon atoms is derived from a cyclopropane, cyclobutane, cyclopentane, cyclopentene, cyclohexane, cyclohexene, cycloheptane, cycloheptene, cyclooctane, cyclooctene, norbornene or norbornane parent ring system.

Claim 13: The composition of any preceding claim wherein the polyfunctional carboxylic acid comprises a cycloaliphatic dicarboxylic acid having 5 to 19 carbon atoms, wherein the cycloaliphatic dicarboxylic acid having 5 to 19 carbon atoms is selected from camphoric acid, cis-norbornene-endo-2,3-carboxylic acid, cis-norbornane-endo-2,3-carboxylic acid, 1,2-cyclohexanedicarboxylic acid, 1,3-cyclohexanedicarboxylic acid or 1,4-cyclohexanedicarboxylic acid.

Claim 14: The composition of any preceding claim wherein the polyfunctional carboxylic acid comprises one or more aliphatic linear difunctional carboxylic acids and/or one or more branched difunctional carboxylic acids.

Claim 15: The composition of any preceding claim wherein the polyfunctional carboxylic acid comprises one or more aliphatic linear difunctional carboxylic acids.

Claim 16: The composition of any one of claims 15-16 wherein the aliphatic linear difunctional carboxylic acid comprises oxalic acid, malonic acid, succinic acid, glutaric acid, adipic acid, pimelic acid, suberic acid, azelaic acid, sebacic acid, undecanedioic acid, and dodecanedioic acid.

Claim 17: The composition of any preceding claim having a hydroxyl value of less than 56 mg KOH/g.

Claim 18: The composition of any preceding claim having a hydroxyl value of from about 6 mg KOH/g to about 45 mg KOH/g.

Claim 19: The composition of any preceding claim having a hydroxyl value of from about 7 mg KOH/g to about 40 mg KOH/g.

Claim 20: The composition of any preceding claim having an acid number of less than about 40 mg KOH/g.

Claim 21: The composition of any preceding claim having an acid number of less than about 20 mg KOH/g.

Claim 22: The composition of any preceding claim having an acid number of less than about 10 mg KOH/g.

Claim 23: The composition of any preceding claim having a softening point of from about 80° C. to about 150° C.

Claim 24: The composition of any preceding claim having a softening point of from about 90° C. to about 130° C.

Claim 25: The composition of any preceding claim having a softening point of from about 100° C. to about 120° C.

Claim 26: The composition of any preceding claim having a viscosity at 150° C. of from about 1,000 mPa·s to about 100,000 mPa·s.

Claim 27: The composition of any preceding claim having a viscosity at 150° C. of from about 500 mPa·s to about 50,000 mPa·s.

Claim 28: The composition of any preceding claim having a viscosity at 150° C. of from about 1,200 mPa·s to about 10,000 mPa·s.

Claim 29: The composition of any preceding claim having a viscosity at 175° C. of from about 200 mPa·s to about 10,000 mPa·s.

Claim 30: The composition of any preceding claim having a viscosity at 175° C. of from about 270 mPa·s to about 4,000 mPa·s.

Claim 31: The composition of any preceding claim having a viscosity at 175° C. of from about 270 mPa·s to about 1,000 mPa·s.

Claim 32: The composition of any preceding claim having a viscosity at 200° C. of from about 70 mPa·s to about 3,000 mPa·s.

Claim 33: The composition of any preceding claim having a viscosity at 200° C. of from about 90 mPa·s to about 1,000 mPa·s.

Claim 34: The composition of any preceding claim having a viscosity at 200° C. of from about 90 mPa·s to about 200 mPa·s.

Claim 35: The composition of any preceding claim having a PAN number of less than about 40%.

Claim 36: The composition of any preceding claim having a PAN number of less than about 20%.

Claim 37: The composition of any preceding claim having a PAN number of less than about 15%.

Claim 38: The composition of any preceding claim having a glass transition temperature of from 30° C. to 100° C.

Claim 39: The composition of any preceding claim having a glass transition temperature of from 40° C. to 80° C.

Claim 40: The composition of any preceding claim having a glass transition temperature of from 44° C. to 70° C.

Claim 41: The composition of any one of claims 1-26 having a viscosity at 150° C. of from about 1,000 mPa·s to about 100,000 mPa·s, and a glass transition temperature of from 30° C. to 100° C.

Claim 42: The composition of any one of claims 1-26 having a viscosity at 175° C. of from about 200 mPa·s to about 10,000 mPa·s, and a glass transition temperature of from 30° C. to 100° C.

Claim 43: The composition of any one of claims 1-26 having a viscosity at 200° C. of from about 70 mPa·s to about 3,000 mPa·s, and a glass transition temperature of from 30° C. to 100° C.

Claim 44: The composition of any preceding claim having a number average molecular weight (Mn) of from about 700 g/mol to about 2,500 g/mol.

Claim 45: The composition of any preceding claim having a number average molecular weight (Mn) of from about 800 g/mol to about 1,500 g/mol.

Claim 46: The composition of any preceding claim having a number average molecular weight (Mn) of from about 900 g/mol to about 1300 g/mol.

Claim 47: The composition of any preceding claim having a weight average molecular weight (Mw) of from about 1,000 g/mol to about 4,000 g/mol.

Claim 48: The composition of any preceding claim having a weight average molecular weight (Mw) of from about 1,100 g/mol to about 3,000 g/mol.

Claim 49: The composition of any preceding claim having a weight average molecular weight (Mw) of from about 1,200 g/mol to about 1,700 g/mol.

Claim 50: The composition of any preceding claim having a third power average molecular weight (Mz) of from about 1,000 g/mol to about 12,000 g/mol.

Claim 51: The composition of any preceding claim having a third power average molecular weight (Mz) of from about 1,200 g/mol to about 7,000 g/mol.

Claim 52: The composition of any preceding claim having a third power average molecular weight (Mz) of from about 1,500 g/mol to about 2,500 g/mol.

Claim 53: The composition of any preceding claim wherein the polyhydric alcohol comprises any hydrocarbon having at least 2 hydroxyl groups.

Claim 54: The composition of any preceding claim wherein the polyhydric alcohol has an average number of hydroxyl functionalities of from 2 to 10.

Claim 55: The composition of any preceding claim wherein the polyhydric alcohol comprises from 2 to 30 carbon atoms.

Claim 56: The composition of any preceding claim wherein the polyhydric alcohol comprises up to a total 20 wt. % of one or more monoalcohols, wherein the monoalcohols are characterized by a boiling point of greater than about 230° C.

Claim 57: The composition of any preceding claim wherein the polyhydric alcohol comprises an aliphatic alcohol or a cycloaliphatic alcohol.

Claim 58: The composition of any preceding claim wherein the polyhydric alcohol comprises a glycol, a sugar, a reduced sugar, an oligomer of a glycol, or combinations thereof.

Claim 59: The composition of any preceding claim wherein the polyhydric alcohol comprises ethylene glycol, propylene glycol, diethylene glycol, triethylene glycol, tetraethylene glycol, neopentylglycol, trimethylene glycol, glycerol, trimethylolpropane, trimethylolethane, pentaerythritol, pentaerythritol technical grade, dipentaerythritol, tripentaerythritol, 1,4-cyclohexanediol, polyglycerol, polyglycerol technical grade, polyglycerol-3, polyglycerol-4, cyclohexane-1,4-dimethanol, tricyclo[5.2.1.0(2.6)]decane-4,8-dimethanol, hydrogenated bisphenol A (4,4'-isopropylidenedicyclohexanol), mannitol, sorbitol, xylitol, maltitol, lactitol, or combinations thereof.

Claim 60: The composition of any preceding claim, wherein the polyhydric alcohol is present in a mixture for preparation of the oligoester composition in an amount of from about 5 wt. % to about 35 wt. %, based on the weight of all reactants.

Claim 61: The composition of any preceding claim wherein the rosin comprises tall oil rosin, wood rosin, gum rosin, hydrogenated rosin, hydrogenated gum rosin, disproportionated rosin, partly disproportionated rosin, or combinations thereof.

Claim 62: The composition of any preceding claim derived from tall oil rosin.

Claim 63: The composition of any preceding claim, wherein the rosin is present in a mixture for preparation of the oligoester composition in an amount of from about 55 wt. % to about 95 wt. %, based on the weight of all reactants.

Claim 64: The composition of any preceding claim, wherein at least one of the polyfunctional carboxylic acids is a non-dienophilic polyfunctional carboxylic acid.

Claim 65: The composition of claim 65, wherein the non-dienophilic polyfunctional carboxylic acid comprises a saturated non-dienophilic dicarboxylic acid.

Claim 66: A composition comprising: 1% by weight to 60% by weight, based on the total weight of the composition, of a polymer or polymer blend; and 1% by weight to 60% by weight, based on the total weight of the composition, of an oligoester composition derived from: one or more rosins, one or more polyhydric alcohols, and one or more polyfunctional carboxylic acids, wherein at least one of the polyfunctional carboxylic acids represents a cycloaliphatic polyfunctional carboxylic acids having 5 to 19 carbon atoms, and wherein the one or more polyfunctional carboxylic acids is present in a mixture for preparation of the oligoester composition in an amount of from more than zero up to about 15 wt. %, based on the weight of all reactants.

Claim 67: A thermoplastic road marking composition comprising: up to 20% by weight, based on the total weight of the thermoplastic road marking composition, of polymer; and, 5% by weight to 30% by weight, based on the total weight of the thermoplastic road marking composition, of an oligoester composition derived from: one or more rosins, one or more polyhydric alcohols, and one or more polyfunctional carboxylic acids, wherein at least one of the polyfunctional carboxylic acids represents a cycloaliphatic polyfunctional carboxylic acid having 5 to 19 carbon atoms, and wherein the one or more polyfunctional carboxylic acids is present in a mixture for preparation of the oligoester composition in an amount of from more than zero up to about 15 wt. %, based on the weight of all reactants.

Claim 68: A thermoplastic road marking composition comprising: up to 20% by weight, based on the total weight of the thermoplastic road marking composition, of polymer, and 5% by weight to 30% by weight, based on the total weight of the thermoplastic road marking composition, of an oligoester composition derived from: one or more tall oil based rosins, one or more polyhydric alcohols, and one or more dicarboxylic acids, wherein at least one of the dicarboxylic acids represents a cycloaliphatic dicarboxylic acid having 5 to 19 carbon atoms, wherein the one or more dicarboxylic acids is present in a mixture for preparation of the oligoester composition in an amount of from more than zero up to about 15 wt. %, based on the weight of all reactants, and wherein in the dicarboxylic acid molecular formula the number of hydrogen atoms is higher than the number of carbon atoms.

Claim 69: An adhesive composition comprising: 10% by weight up to 60% by weight, based on the total weight of the adhesive composition, of polymer; and 5% by weight to 60% by weight, based on the total weight of the adhesive composition, of an oligoester composition derived from: one or more rosins, one or more polyhydric alcohols, and one or more polyfunctional carboxylic acids, wherein at least one of the polyfunctional carboxylic acids represents a cycloaliphatic polyfunctional carboxylic acid having 5 to 19 carbon atoms, and wherein the one or more polyfunctional carboxylic acids is present in a mixture for preparation of the oligoester composition in an amount of from more than zero up to about 15 wt. %, based on the weight of all reactants.

Claim 70: An adhesive composition comprising: 10% by weight up to 60% by weight, based on the total weight of the adhesive composition, of polymer, and 5% by weight to 60% by weight, based on the total weight of the adhesive composition, of an oligoester composition derived from: one or more tall oil based rosins, one or more polyhydric alcohols, and one or more dicarboxylic acids, wherein at least one of the dicarboxylic acids represents a cycloaliphatic dicarboxylic acid having 5 to 19 carbon atoms, wherein the one or more dicarboxylic acids is present in a mixture for preparation of the oligoester composition in an amount of from more than zero up to about 15 wt. %, based on the weight of all reactants, and wherein in the dicarboxylic acid molecular formula the number of hydrogen atoms is higher than the number of carbon atoms.

Claim 71: A hot-melt adhesive composition comprising: 20% by weight up to 50% by weight, based on the total weight of the hot-melt adhesive composition, of polymer; 10% by weight to 60% by weight of an oligoester composition derived from: one or more tall oil based rosins, one or more polyhydric alcohols, and one or more dicarboxylic acids, wherein at least one of the dicarboxylic acids represents a cycloaliphatic dicarboxylic acid having 5 to 19 carbon atoms, wherein the one or more dicarboxylic acids is present in a mixture for preparation of the oligoester composition in an amount of from more than zero up to about 15 wt. %, based on the weight of all reactants, and wherein in the dicarboxylic acid molecular formula the number of hydrogen atoms is higher than the number of carbon atoms, and 5% by weight to 35% by weight, based on the total weight of the hot-melt adhesive composition, of one or more waxes.

Claim 72: A method for preparing an adhesive composition comprising mixing one or more polymers and an oligoester composition, wherein the oligoester composition is derived from: one or more tall oil based rosins, one or more polyhydric alcohols, and one or more dicarboxylic acids, wherein at least one of the dicarboxylic acids represents a cycloaliphatic dicarboxylic acid having 5 to 19 carbon atoms, wherein the one or more dicarboxylic acids is present in a mixture for preparation of the oligoester composition in an amount of from more than zero up to about 15 wt. %, based on the weight of all reactants, and wherein in the dicarboxylic acid molecular formula the number of hydrogen atoms is higher than the number of carbon atoms.

Claim 73: A method for preparing a thermoplastic road marking composition comprising mixing one or more polymers and an oligoester composition, wherein the oligoester composition is derived from: one or more tall oil based rosins, one or more polyhydric alcohols, and one or more dicarboxylic acids, wherein at least one of the dicarboxylic acids represents a cycloaliphatic dicarboxylic acid having 5 to 19 carbon atoms, wherein the one or more dicarboxylic acids is present in a mixture for preparation of the oligoester composition in an amount of from more than zero up to about 15 wt. %, based on the weight of all reactants, and wherein in the dicarboxylic acid molecular formula the number of hydrogen atoms is higher than the number of carbon atoms.

Claim 74: A method for preparing a hot-melt adhesive composition comprising mixing one or more polymers, one or more waxes, and an oligoester composition, wherein the oligoester composition is derived from: one or more tall oil based rosins, one or more polyhydric alcohols, and one or more dicarboxylic acids; wherein at least one of the dicarboxylic acids represents a cycloaliphatic dicarboxylic acid having 5 to 19 carbon atoms, wherein the one or more dicarboxylic acids is present in a mixture for preparation of the oligoester composition in an amount of from more than zero up to about 15 wt. %, based on the weight of all reactants, and wherein in the dicarboxylic acid molecular formula the number of hydrogen atoms is higher than the number of carbon atoms.

Claim 75: A method for preparing a tire tread composition comprising mixing one or more rubber polymers, one or more fillers, and an oligoester composition, wherein the oligoester composition is derived from: one or more tall oil based rosins, one or more polyhydric alcohols, and one or more dicarboxylic acids, wherein at least one of the dicarboxylic acids represents a cycloaliphatic dicarboxylic acid having 5 to 19 carbon atoms, wherein the one or more dicarboxylic acids is present in a mixture for preparation of the oligoester composition in an amount of from more than zero up to about 15 wt. %, based on the weight of all reactants, and wherein in the dicarboxylic acid molecular formula the number of hydrogen atoms is higher than the number of carbon atoms.

Claim 76: A tire tread composition comprising: a rubber polymer, a filler, and 1 to 80 parts by weight, based on 100 parts by weight of the rubber polymer, of an oligoester composition derived from: one or more rosins, one or more polyhydric alcohols, and one or more polyfunctional carboxylic acids, wherein at least one of the polyfunctional carboxylic acids represents a cycloaliphatic polyfunctional carboxylic acid having 5 to 19 carbon atoms, and wherein the one or more polyfunctional carboxylic acids is present in a mixture for preparation of the oligoester composition in an amount of from more than zero up to about 15 wt. %, based on the weight of all reactants.

Claim 77: A tire tread composition comprising: a rubber polymer, a filler, and 5 to 70 parts by weight, based on 100 parts by weight of the rubber polymer, of an oligoester composition derived from: one or more tall oil rosins, one or more polyhydric alcohols, and one or more dicarboxylic acids, wherein at least one of the dicarboxylic acids represents a cycloaliphatic dicarboxylic acid having 5 to 19 carbon atoms, wherein the one or more dicarboxylic acids is present in a mixture for preparation of the oligoester composition in an amount of from more than zero up to about 15 wt. %, based on the weight of all reactants, and wherein in the dicarboxylic acid molecular formula the number of hydrogen atoms is higher than the number of carbon atoms.

Claim 78: A tire tread composition comprising: a copolymer derived from styrene and one or more monomers selected from the group consisting of isoprene and butadiene, a filler, and 5 to 70 parts by weight, based on 100 parts by weight of the copolymer, of an oligoester composition derived from: one or more tall oil rosins, one or more polyhydric alcohols, and one or more dicarboxylic acids, wherein at least one of the dicarboxylic acids represents a cycloaliphatic dicarboxylic acid having 5 to 19 carbon atoms, wherein the one or more dicarboxylic acids is present in a mixture for preparation of the oligoester composition in an amount of from more than zero up to about 15 wt. %, based on the weight of all reactants, and wherein in the dicarboxylic acid molecular formula the number of hydrogen atoms is higher than the number of carbon atoms.

Claim 79: A method of making an oligoester composition comprising: contacting one or more rosins and one or more polyfunctional carboxylic acids with one or more alcohols at a temperature of at least 150° C. to produce a reaction mixture, wherein at least one of the polyfunctional carboxylic acids represents a cycloaliphatic polyfunctional carboxylic acid having 5 to 19 carbon atoms, and esterifying the reaction mixture at a maximum temperature of 300° C. in the absence or presence of an esterification catalyst, and in the presence or absence of a disproportionation catalyst.

Claim 80: The method of claim 80, wherein the rosin comprises tall oil rosin, wood rosin, gum rosin, hydrogenated rosin, hydrogenated gum rosin, disproportionated rosin, partly disproportionated rosin, or combinations thereof.

Claim 81: The method of claim 79, wherein the oligoester composition is derived from t tall oil rosin, wood rosin, gum rosin, hydrogenated rosin, hydrogenated gum rosin, disproportionated rosin, partly disproportionated rosin, or combinations thereof.

Claim 82: The method of any one of claims 77-81, wherein the disproportionation catalyst is contacted with the reaction mixture in an amount of more than 0.05 wt. % disproportionation catalyst, based on the total weight of the reaction mixture.

Claim 83: An oligoester composition derived from: one or more rosins, one or more polyhydric alcohols, and one or more non-dienophilic polyfunctional carboxylic acids, wherein at least one of the non-dienophilic polyfunctional carboxylic acids comprises a cycloaliphatic polyfunctional carboxylic acid having 5 to 19 carbon atoms.

Claim 84: An oligoester composition derived from: one or more rosins, one or more polyhydric alcohols, and one or more non-dienophilic polyfunctional carboxylic acids comprising aliphatic dicarboxylic acids, wherein at least one of the aliphatic dicarboxylic acids comprises a cycloaliphatic dicarboxylic acid having 5 to 19 carbon atoms.

Claim 85: An oligoester composition derived from: one or more rosins, one or more polyhydric alcohols, and one or more non-dienophilic polyfunctional carboxylic acids comprising saturated dicarboxylic acids, wherein at least one of the dicarboxylic acids comprises a cycloaliphatic dicarboxylic acid having 5 to 19 carbon atoms, and wherein the total of dicarboxylic acids amounts from more than zero up to 15 wt. %, by weight of all reactants.

What is claimed is:
1. An oligoester composition obtained from a reactant mixture comprising:
  one or more rosin selected from the group consisting of tall oil rosin and gum rosin;
  one or more polyhydric alcohol selected from the group of polyhydric alcohols having from 2 to 30 carbon atoms, at least 2 alcohol groups, and an average number of hydroxyl functionalities of from 2 to 10; and
  from 0.5 wt. % to 15 wt. %, based on the weight of all reactants, of one or more-cycloaliphatic dicarboxylic acids having 5 to 19 carbon atoms, wherein in the cycloaliphatic dicarboxylic acid molecular formula, the number of hydrogen atoms is higher than the number of carbon atoms;

wherein the one or more polyhydric alcohol is present in the mixture for preparation of the oligoester composition in an amount of from 5 wt. % to 35 wt. %, based on the weight of all reactants; and wherein the oligoester composition has a hydroxyl value of from 7 mg KOH/g to 40 mg KOH/g.

2. The oligoester composition of claim 1, wherein the ratio of the average number of carbon atoms to the average number of rotatable bonds in the cycloaliphatic dicarboxylic acid having 5 to 19 carbon atoms is higher than 1.5.

3. The oligoester composition of claim 2, wherein the ratio of the average number of carbon atoms to the average number of rotatable bonds in the cycloaliphatic dicarboxylic acid having 5 to 19 carbon atoms is higher than 3.

4. The oligoester composition of claim 1, wherein the one or more cycloaliphatic dicarboxylic acids having 5 to 19 carbon atoms is present in a mixture for preparation of the oligoester composition in an amount of from 2 wt. % to 7 wt. %, based on the weight of all reactants.

5. The oligoester composition of claim 1, wherein the cycloaliphatic dicarboxylic acid having 5 to 19 carbon atoms is derived from a cyclopropane, cyclobutane, cyclopentane, cyclopentene, cyclohexane, cyclohexene, cycloheptane, cycloheptene, cyclooctane, cyclooctene, norbornene or norbornane parent ring system.

6. The oligoester composition of claim 5, wherein the cycloaliphatic dicarboxylic acid having 5 to 19 carbon atoms is selected from camphoric acid, cis-norbornene-endo-2,3-carboxylic acid, cis-norbornane-endo-2,3-carboxylic acid, 1,2-cyclohexanedicarboxylic acid, 1,3-cyclohexanedicarboxylic acid or 1,4-cyclohexanedicarboxylic acid.

7. The oligoester composition of claim 1 having a viscosity at 150° C. of from 1,200 mPa·s to 10,000 mPa·s.

8. The oligoester composition of claim 1 having a viscosity at 200° C. of from 90 mPa·s to 1,000 mPa·s.

9. The oligoester composition of claim 1 having a number average molecular weight (Mn) of from 800 g/mol to 1,500 g/mol.

10. The oligoester composition of claim 1, wherein the polyhydric alcohol is selected from the group consisting of ethylene glycol, propylene glycol, diethylene glycol, triethylene glycol, tetraethylene glycol, neopentylglycol, trimethylene glycol, glycerol, trimethylolpropane, trimethylolethane, pentaerythritol, pentaerythritol, dipentaerythritol, tripentaerythritol, 1,4-cyclohexanediol, polyglycerol, polyglycerol, polyglycerol-3, polyglycerol-4, cyclohexane-1,4-dimethanol, tricyclo[5.2.1.0(2.6)]decane-4,8-dimethanol, hydrogenated bisphenol A (4,4'-isopropylidenedicyclohexanol), mannitol, sorbitol, xylitol, maltitol, lactitol, and combinations thereof.

11. A composition comprising: 1-60% by weight of the oligoester composition of claim 1, and 1-60% by weight of a polymer or polymer blend, based on the total weight of the composition.

12. A thermoplastic road marking composition comprising the oligoester composition of claim 1, and up to 20% by weight, based on the total weight of the thermoplastic road marking composition, of a polymer, wherein
the oligoester composition is present in an amount of 5% by weight to 30% by weight, based on the total weight of the thermoplastic road marking composition.

13. An adhesive composition comprising:
5-60% by weight of the oligoester composition of claim 1, and 10-60% by weight of a polymer, based on the total weight of the adhesive composition.

14. A tire tread composition comprising:
a) the oligoester composition of claim 1;
b) a rubber polymer; and
c) a filler;
wherein the oligoester composition is present in an amount from 5-70 parts by weight, per 100 parts by weight of the rubber polymer.

15. A tire tread composition comprising:
a) a copolymer derived from styrene and one or more monomers selected from the group consisting of isoprene and butadiene;
b) 5 to 70 parts by weight, based on 100 parts by weight of the copolymer, of the oligoester composition of claim 1; and
c) a filler.

* * * * *